Patented June 6, 1933

1,912,473

UNITED STATES PATENT OFFICE

JOHN H. BUCHANAN, OF AMES, IOWA, ASSIGNOR TO AMERICAN BOTTLERS OF CARBONATED BEVERAGES, OF WASHINGTON, DISTRICT OF COLUMBIA, A CORPORATION

METHOD OF TITRATION FOR DETERMINING THE CAUSTIC STRENGTH OF ALKALINE SOLUTIONS

No Drawing.  Application filed June 22, 1929. Serial No. 373,050.

My invention relates to an improvement in titration methods involving the use of barium chloride tropaolin O, and potassium bisulfate.

The principle upon which the invention is based is the precipitation of noncaustics from the alkaline solution being tested and the determination of the percentage that the caustic remaining bears to the whole solution, my method being designed to furnish a simple, yet sufficiently accurate test. Instead of employing the usual apparatus and forms of reagents used in determining caustic content, such as strong acids in liquid form, my method involves the use of a solid, soluble, weakly ionized acid salt, prepared in tablets or other portions bearing a predetermined relation to a specific amount of the solution to be tested, in combination with other elements hereinafter specified.

This is further explained as follows:

For convenience I have usually employed my invention in measuring the caustic content of ten cubic centimeters of the solution to be tested.

With such a known quantity of the solution, one tablet or portion, containing a sufficient quantity of precipitating agent is dissolved therein for the purpose of precipitating out of solution all noncaustic alkalies, such as carbonates and phosphates. Barium chloride is used as the precipitating agent in making my test, each tablet or portion being prepared to weigh about twenty grains, with sufficient binder or filler to prevent the tablets from disintegrating.

As means for indicating visibly the complete neutralization of the caustic in solution I use the indicator tropaolin O. The indicator may be added to the alkaline solution as an ingredient of the barium chloride tablet, or it may be added to the solution separately if so desired. If used as an ingredient of the barium chloride tablet it is used therein in the ratio of 1 part to 1000 parts of barium chloride.

To neutralize the caustic in solution, and thus measure its strength I use the solid acid potassium bisulfate, prepared in solid portions having a predetermined value or relation to the sample being tested. I have usually standardized the grainage of these acid portions, or tablets, so that each is equivalent to five cubic centimeters of twenty-five hundredths normal alkali. This represents one-half of one percent of ten cubic centimeters of twenty-five hundredths normal alkali calculated as sodium hydroxide, the quantity of solution to be tested. The percentage could, of course, be varied in grainage to represent one percent, and so on, or the tablets could be scored in the usual manner so as to be accurately broken into halves or quarters and thus represent one-fourth or one-eighth percent.

Potassium bisulfate in combination with tropaolin O have not heretofore been used in the manner herein specified in testing solutions in which there is precipitated material present. Other tests have usually required that such a degree of skill, technical knowledge, and equipment, that they were not usable by the average person, and have generally been based upon the premise that tests such as mine, performed quickly and using unusually large portions of acid, were impracticable and inaccurate because of the possibility of action of such acid upon the barium carbonate present.

In my test this is not any disadvantage, as I have found that potassium bisulfate made the test sufficiently accurate for all practical purposes, either because the test was made so quickly that there was insufficient time for any reaction with the precipitated barium carbonate, or that if such reaction did take place the $CO_2$ thrown off was blanketed by the concentrated suspension of solids in the layer of alkaline solution above it and the dissolving solids of the acid tablet, barium carbonate being formed because of the excess barium chloride present, so that the final result is correct. Tests other than that herein described are inoperative when barium phosphate is present, but my test gives a correct indication of the caustic in solution notwithstanding that element generally used in the type of washing solutions for which the test is particularly adapted.

The procedure for making the test is as follows:

When the noncaustics have been precipitated by the barium chloride, the solution will be colored a brick red by the indicator, if it is caustic.

One of the acid portions, or tablets, is then dropped into the solution and pulverized against the bottom of the graduate by means of a stirring rod. When dissolved, if the caustic strength is less than one-half of one percent the color of the solution will be changed to lemon yellow.

If the caustic strength is more than one half of one percent then additional acid tablets, or portions, are added until the lemon yellow color appears. The approximate caustic strength of the solution is thus determined because of the fact that the total number of whole tablets necessary to cause the yellow color is numerically very close to twice the proportion of the caustic to the whole solution in terms of percentage. That is, each whole tablet added until the yellow color is obtained substantially represents a strength of one-half of one percent of alkali calculated as sodium hydroxide. The observance of this color change is facilitated by the background formed by the insoluble barium sulfate, resulting from the combination of the potassium acid sulfate with excess barium cloride.

Having thus described my invention, I claim:

A method of titration to determine the caustic strength of solutions containing caustic, carbonates, and phosphates, comprising conversion thereof into caustic solution, barium carbonate, and barium phosphate, rendering visible the caustic condition of said solution by tropaolin O, and measuring the causticity by adding portions of solid potassium bisulfate at the bottom of said solution, each of said portions being equivalent to a predetermined proportion by weight of sodium hydroxide.

JOHN H. BUCHANAN.